(12) United States Patent
White et al.

(10) Patent No.: US 9,879,738 B2
(45) Date of Patent: Jan. 30, 2018

(54) TORQUE PLATE FOR HEAVY-DUTY VEHICLES

(71) Applicant: HENDRICKSON USA, LLC, Itasca, IL (US)

(72) Inventors: Jay D. White, Massillon, OH (US); Brian Morreale, Akron, OH (US); Matthew Karich, Fairlawn, OH (US)

(73) Assignee: Hendrickson USA, L.L.C., Itasca, IL (US)

( * ) Notice: Subject to any disclaimer, the term of this patent is extended or adjusted under 35 U.S.C. 154(b) by 0 days.

(21) Appl. No.: 14/854,102

(22) Filed: Sep. 15, 2015

(65) Prior Publication Data

US 2016/0076610 A1 Mar. 17, 2016

Related U.S. Application Data

(60) Provisional application No. 62/050,982, filed on Sep. 16, 2014.

(51) Int. Cl.
*F16D 65/38* (2006.01)
*F16D 65/00* (2006.01)
*F16D 55/00* (2006.01)

(52) U.S. Cl.
CPC ......... *F16D 65/0062* (2013.01); *F16D 65/00* (2013.01); *F16D 2055/0012* (2013.01)

(58) Field of Classification Search
CPC .............................. F16D 65/0972; F16D 65/00
USPC ................................ 188/73.39, 205 R, 206 R
See application file for complete search history.

(56) References Cited

U.S. PATENT DOCUMENTS

| | | | |
|---|---|---|---|
| 3,999,635 A | 12/1976 | Hotchkiss | |
| 4,031,986 A | 6/1977 | Thompson | |
| 4,047,598 A | 9/1977 | Thrower | |
| 4,080,003 A * | 3/1978 | Boughton | B60B 35/02 301/125 |
| 4,197,926 A * | 4/1980 | Youngdale | B60T 1/065 188/18 A |
| 4,311,216 A | 1/1982 | Garrett et al. | |
| 4,363,387 A * | 12/1982 | Roberts | F16D 51/24 188/325 |
| 4,553,647 A * | 11/1985 | Spaargaren | F16D 51/24 188/206 R |
| 4,618,159 A * | 10/1986 | Kozyra | B60T 1/065 180/253 |

(Continued)

*Primary Examiner* — Anna M Momper
*Assistant Examiner* — Mahbubur Rashid
(74) *Attorney, Agent, or Firm* — Dureska & Moore, LLC; David P. Dureska; Greg Strugalski (57) ABSTRACT

A torque plate for heavy-duty vehicles includes a reduced size and structural features that enable the torque plate to be used in conjunction with a reduced diameter brake rotor. The torque plate is rigidly attached to an axle of the heavy-duty vehicle. The torque plate includes an axle ring that is formed with a thickness and an opening for receiving the axle, in which the axle ring engages an outer diameter of the axle. Each one of a pair of bodies is formed with a thickness and extends radially outwardly in opposite directions from the axle ring. Each body thickness is less than the axle ring thickness. Each one of a pair of carrier mounting bosses extends radially outwardly from a respective one of the bodies. The torque plate also includes a pair of anti-lock braking system sensor mounting bosses, and a pair of splash guard mounting bosses.

15 Claims, 5 Drawing Sheets

(56) References Cited

U.S. PATENT DOCUMENTS

| | | | |
|---|---|---|---|
| 5,566,791 A | 10/1996 | Ohishi | |
| 5,865,275 A * | 2/1999 | Anger | F16D 63/004 164/98 |
| 6,241,266 B1 * | 6/2001 | Smith | B60B 35/04 280/124.116 |
| 6,279,695 B1 * | 8/2001 | Davison | F16D 51/22 188/206 A |
| 6,354,408 B1 | 3/2002 | Bailey et al. | |
| 6,926,122 B2 | 8/2005 | Wittlinger et al. | |
| 7,229,137 B2 | 6/2007 | Roberts et al. | |
| 7,708,124 B1 * | 5/2010 | Rackers | B60B 35/16 188/206 A |
| 8,307,958 B2 * | 11/2012 | Drewes | F16D 55/22 188/205 R |
| 8,371,422 B2 | 2/2013 | Frost et al. | |
| 2005/0023088 A1 | 2/2005 | Gripemark | |
| 2005/0168056 A1 * | 8/2005 | Roberts | B60B 35/04 301/124.1 |
| 2009/0008194 A1 | 1/2009 | Redemann et al. | |
| 2009/0301825 A1 * | 12/2009 | Frost | F16D 55/22 188/206 R |
| 2012/0247885 A1 * | 10/2012 | Lantz | F16D 65/00 188/205 R |
| 2013/0277936 A1 | 10/2013 | Westnedge et al. | |

* cited by examiner

TORQUE PLATE FOR HEAVY-DUTY VEHICLES

CROSS-REFERENCE TO RELATED APPLICATIONS

This application claims the benefit of U.S. Provisional Patent Application Ser. No. 62/050,982, which was filed on Sep. 16, 2014.

BACKGROUND OF THE INVENTION

Technical Field

The invention relates to the art of disc brake systems for heavy-duty vehicles. More particularly, the invention relates to torque plates of disc brake systems for heavy-duty vehicles. Still more particularly, the invention is directed to a torque plate for heavy-duty vehicles that includes a reduced size and unique structural adaptations, which enable the torque plate to be used in conjunction with a reduced diameter brake rotor and also save weight and cost, while maintaining strength and performance to ensure optimum operation of the brake system.

Background Art

Disc brake systems for vehicles are well known in the brake art. Such systems operate by forcing a pair of opposing brake pads against a rotor, thereby creating friction between the pads and the rotor to enable slowing and/or stopping of the vehicle. More particularly, a disc brake system includes a plurality of disc brake assemblies, in which each assembly is operatively mounted on or adjacent a wheel end of the vehicle.

Each disc brake assembly includes a carrier, which supports a caliper that is described in greater detail below, and is attached to a torque plate, typically by mechanical fasteners, such as bolts. The torque plate in turn is rigidly connected to an axle of an axle/suspension system of the vehicle, such as by welding. The torque plate resists the torque that is generated during braking, and maintains proper alignment of the carrier and caliper to ensure optimum operation of the components of the brake assembly.

As mentioned above, the carrier supports a caliper, and the caliper is formed with a bore for receiving one or more pistons and an actuator. The actuator typically is a brake air chamber, which is in fluid communication with a compressed air source and activates movement of the piston(s). The caliper also includes a reaction arm that is disposed opposite the piston(s). Each one of a pair of opposing brake pads includes friction material that is mounted on a backing plate, and is seated in the carrier, with one of the pads being adjacent the piston(s) and the other pad being adjacent the reaction arm. Upon actuation by the actuator, the piston(s) and the reaction arm cooperate to control movement of the brake pads.

The rotor includes a disc portion, which is disposed between the brake pads in a manner that allows the friction material of each pad to face a respective surface of the disc portion. The rotor also includes a mounting portion that is adapted for mounting to a respective wheel end assembly of the vehicle by mechanical fasteners, such as bolts. A sleeve typically is integrally formed with and extends between the disc portion and the mounting portion of the rotor. This construction enables the rotor to be rigidly connected to the wheel end assembly, and thus to a respective vehicle wheel.

During vehicle travel, when the vehicle brake system is engaged, compressed air flows to the actuator, which engages movement of the piston(s) and the reaction arm, which in turn forces the friction material of the pads against the disc portion of the rotor, slowing and/or stopping rotation of the rotor, thereby slowing and/or stopping rotation of the vehicle wheel.

As mentioned above, the torque plate maintains proper alignment of the carrier and caliper to ensure optimum operation of the components of the brake assembly. More particularly, the carrier is bolted to the torque plate to hold the caliper square to the rotor to facilitate efficient braking. It is known in the art that if the caliper, brake pads, and/or other brake system components are not mounted and maintained square to the rotor, then issues with such components can occur. For example, uneven brake pad wear, binding of components, and cracking of the rotor or caliper may occur, and all of these conditions undesirably impair operation of the brake system.

To provide optimum functioning of the brake system and thus reduce the potential for such undesirable conditions to occur, it has become industry practice to maintain the outboard face of the torque plate perpendicular to the center line of the axle spindle to a tolerance of less than 0.020 inches, and to maintain the inboard face somewhat parallel to the outboard face. Maintaining the torque plate square with the axle spindle to such a tolerance enables the caliper, brake pads, and/or other brake system components to be maintained square to the rotor for optimum functioning of the brake system.

In the prior art, torque plates have typically been flat plates that are hot rolled and then plasma cut, or they are cast or forged. Torque plates that are hot rolled and plasma cut typically have to be machined, which undesirably increases the cost of the torque plate, and/or include undesirable levels of residual stresses. Torque plates that are cast often experience issues with porosity that may lead to an increased scrap rate, which undesirably increases the cost of the torque plate. Prior art forged torque plates include residual stresses, but tend to be stronger than hot rolled or cast torque plates.

Prior art torque plates are welded to the axle and are formed with six openings to receive bolts that rigidly attach the torque plate to the brake carrier. Also in the prior art, larger brake rotor diameters, such as about 430 millimeters (mm) have been employed. In order to save weight and cost, it has become desirable to reduce the size of the brake rotor, and some rotors have been reduced to a diameter of about 415 mm.

When the rotor is reduced from 430 mm in diameter to about 415 mm in diameter, the radial space about the axle that is available for the torque plate is reduced. In addition, it is becoming more common in the art to employ wheel hub and disc brake configurations that further reduce the available radial space about the axle for the torque plate.

Therefore, there is a need in the art to reduce the size of the torque plate so that the torque plate can be employed in such reduced-diameter systems. It is also desirable to reduce the size of the torque plate to reduce the weight of the plate, which increases the fuel economy of the vehicle, and thereby reduces the cost associated with the torque plate. However, it is necessary to maintain the strength and performance characteristics of the torque plate in order to ensure optimum operation of the brake system. For example, it has been found that a torque plate must still employ six bolts to connect the torque plate to the disc brake carrier in order to maintain the strength and integrity of the connection of the torque plate to the carrier.

In addition, it has become common in the prior art weld the torque plate onto the axle and then machine the weld joint and/or the outboard mounting surface of the torque plate to ensure perpendicularity of the outboard face of the torque plate to the axle, as described above. Such post-weld machining or processing undesirably increases the cost of the torque plate and the time required to form the torque plate.

As a result, there is a need in the art for a torque plate for heavy-duty vehicles that includes a reduced size and structural features which enable the torque plate to be used in conjunction with a reduced diameter brake rotor, and also save weight and cost, while maintaining strength and performance to ensure optimum operation of the brake system, without post-weld processing. The improved torque plate for heavy-duty vehicles of the present invention satisfies these needs, as will be described in detail below.

BRIEF SUMMARY OF THE INVENTION

An objective of the present invention is to provide a torque plate for heavy-duty vehicles that includes a reduced size and structural features which enable the torque plate to be used in conjunction with a reduced diameter brake rotor.

Another objective of the present invention is to provide a torque plate for heavy-duty vehicles that reduces weight and cost when compared to the prior art.

Still another objective of the present invention is to provide a torque plate for heavy-duty vehicles that maintains strength and performance to ensure optimum operation of the brake system.

Yet another objective of the present invention is to provide a torque plate for heavy-duty vehicles that does not require post-weld machining or processing.

These objectives and others are obtained by the torque plate for heavy-duty vehicles of the present invention. In an exemplary embodiment of the invention, the torque plate is rigidly attached to an axle of the heavy-duty vehicle. The torque plate includes an axle ring that is formed with a thickness and an opening for receiving the axle, in which the axle ring engages an outer diameter of the axle. Each one of a pair of bodies is formed with a thickness and extends radially outwardly in opposite directions from the axle ring. Each body thickness is less than the axle ring thickness. Each one of a pair of carrier mounting bosses extends radially outwardly from a respective one of the bodies.

BRIEF DESCRIPTION OF THE SEVERAL VIEWS OF THE DRAWINGS

The preferred embodiment of the invention, illustrative of the best mode in which Applicant has contemplated applying the principles of the invention, is set forth in the following description and is shown in the drawings, and is particularly and distinctly pointed out and set forth in the appended claims.

Similar numerals refer to similar parts throughout the drawings.

DETAILED DESCRIPTION OF THE INVENTION

Figure 1:
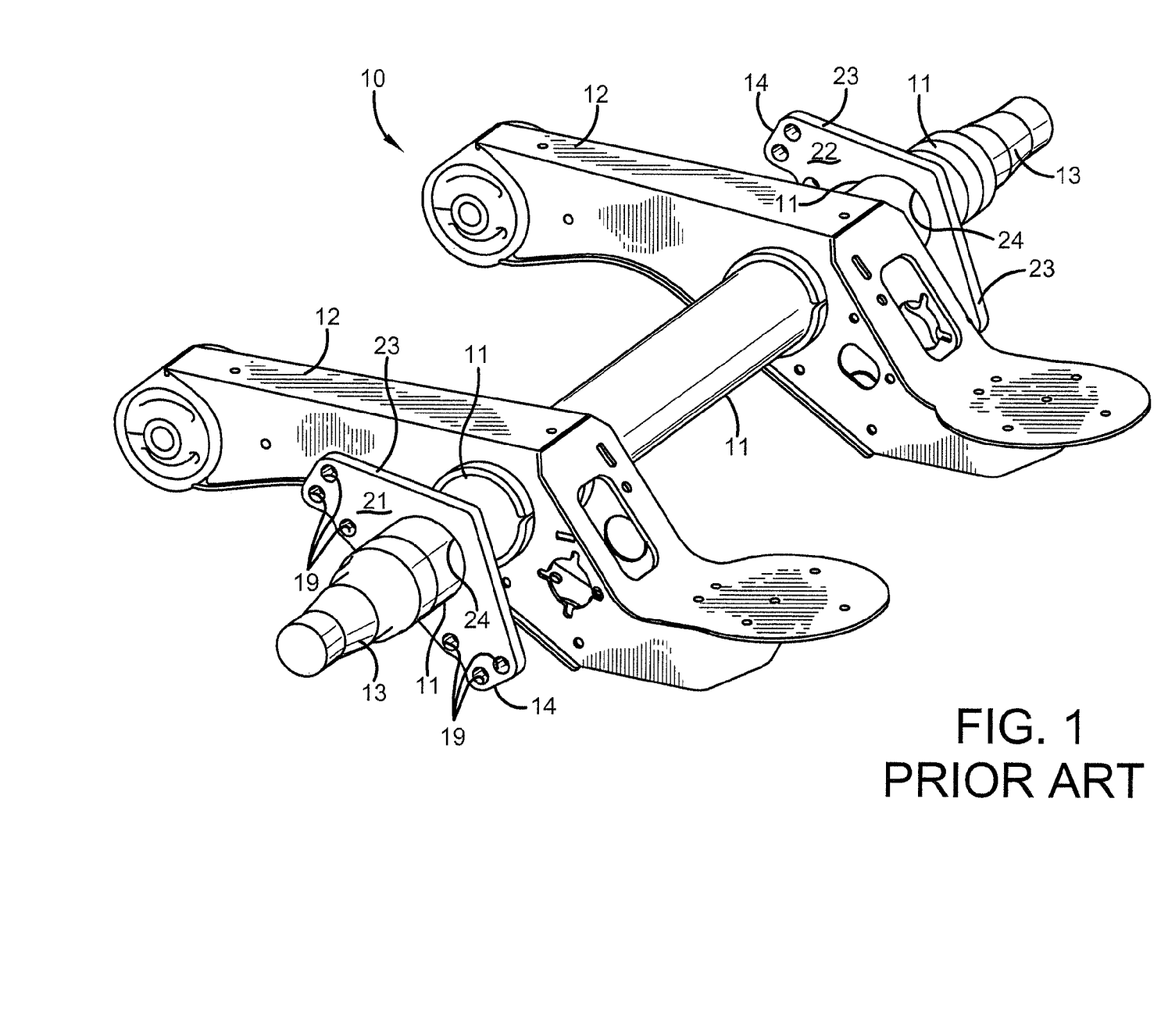
FIG. 1 is a rear perspective view of an underslung trailing arm axle/suspension system, showing a pair of spaced apart prior art torque plates installed on an axle.
Figure 2:
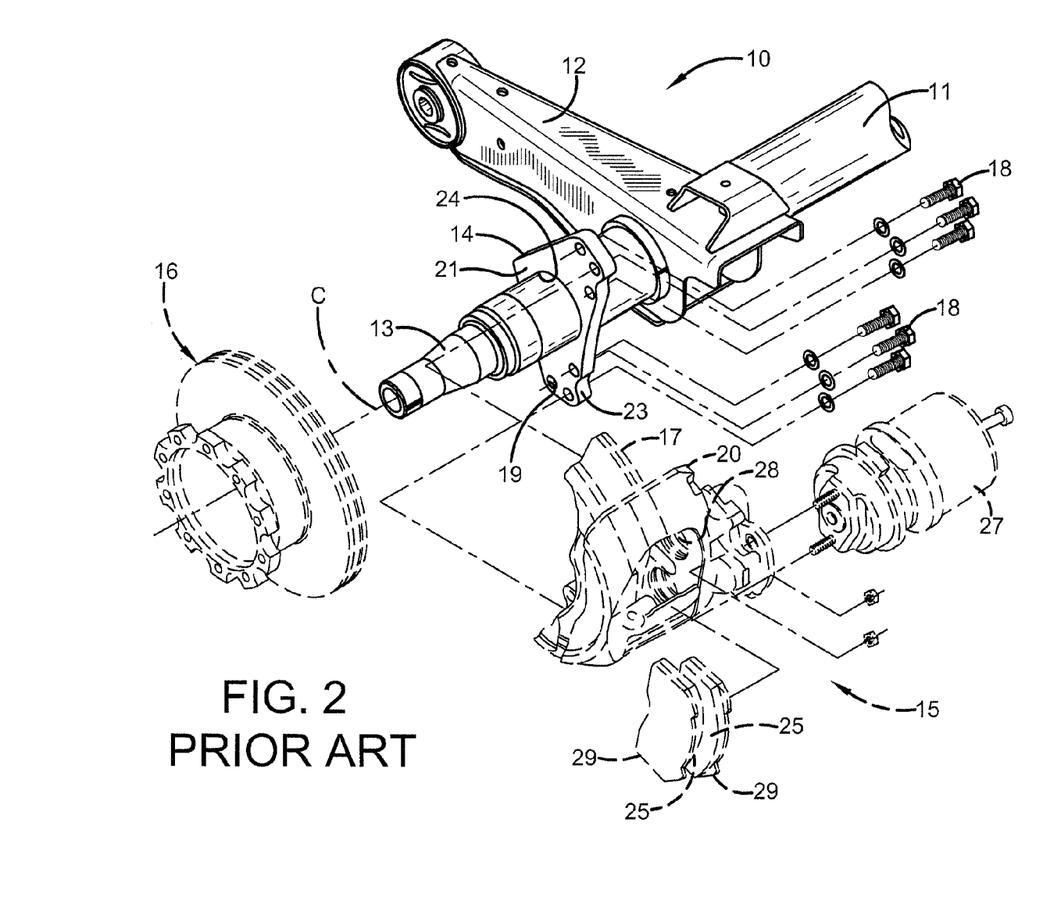
FIG. 2 is a fragmentary perspective view of a left-hand portion of a top-mount trailing arm axle/suspension system with a prior art torque plate installed on an axle, showing in broken lines an exploded view of a typical disc brake assembly.

In order to better understand the improved torque plate for heavy-duty vehicles of the present invention and the environment in which it operates, a prior art torque plate for heavy-duty vehicles 14 is shown in FIGS. 1 and 2, and now will be described. A trailing arm axle/suspension system of the type useful with the present invention is indicated at 10. Axle/suspension system 10 is of a type commonly known in the art and includes an axle tube 11, a pair of trailing arms 12, a pair of axle spindles 13, and a pair of prior art torque plates 14. A pair of brake assemblies 15 (only one shown) is mounted on axle/suspension system 10, and will be described in greater detail below. Unless otherwise noted, all components of axle/suspension system 10 typically are formed of a durable metal such as steel.

Each one of the pair of trailing arms 12 is spaced apart along axle tube 11 and is rigidly attached thereto by a method well known in the art such as welding. Similarly, each one of the pair of axle spindles 13 is fixedly attached to a respective one of the ends of axle tube 11 by any suitable means, such as welds. Each one of torque plates 14 is mounted on axle tube 11 outboard of and spaced apart from a respective one of arms 12.

As best shown in FIG. 2, each brake assembly 15 includes a carrier 17, which supports a caliper 20. Caliper 20 is formed with one or more bores 28 for receiving one or more pistons (not shown) and an actuator 27. Actuator 27 typically is a brake air chamber, which is in fluid communication with a compressed air source (not shown) and activates movement of the pistons. Each one of a pair of opposing brake pads 25 includes friction material that is mounted on a backing plate 29, and is seated in carrier 17 on a respective one of opposing sides of a rotor 16.

Carrier 17 of each brake assembly 15 is removably attached to a respective one of torque plates 14 by six bolts 18, as will be described in greater detail below. Each rotor 16 is removably attached to a wheel hub (not shown) in a manner known to those skilled in the art, and each wheel hub in turn is rotatably mounted on a respective one of axle spindles 13 by means known in the art. The wheel end assembly rotates about the centerline C of axle spindle 13 when the vehicle to which it is attached (not shown) is in motion.

Each torque plate 14 includes an outboard surface 21, an inboard surface 22 that is parallel to the outboard surface, and a peripheral edge 23. In addition, each torque plate 14 is formed with a bore 24 which extends continuously through the torque plate, and is pre-machined perpendicular to outboard surface 21. Each torque plate 14 is welded to axle tube 11 at bore 24 so that outboard surface 21 is perpendicular to center line C of a respective axle spindle 13 to a preferred tolerance of less than 0.020 inches.

Each torque plate 14 is formed with six openings 19, which receive bolts 18 to rigidly connect carrier 17 to the torque plate. The welding of torque plate 14 perpendicular or square to axle spindle center line C, and the rigid attachment of carrier 17 to the torque plate enables caliper 20, brake pads 25, and/or other brake system components to be maintained square to rotor 16 to ensure optimum operation of the components of brake assembly 15.

As described above, there is a need in the art to reduce the size of prior art torque plate 14 so that it can be employed in systems that utilize a reduced-diameter rotor 16, and to reduce the weight and cost associated with the torque plate. However, it is necessary to maintain the strength and performance characteristics of torque plate 14 in order to ensure optimum operation of brake assembly 15. For example, torque plate 14 must be welded to axle tube 11 perpendicular or square to axle spindle center line C, and the torque plate must be rigidly attached to carrier 17 with six bolts 18 to enable caliper 20, brake pads 25, and/or other brake system components to be maintained square to rotor 16 and thus ensure optimum operation of the components of brake assembly 15.

As a result, there is a need in the art for a torque plate for heavy-duty vehicles that includes a reduced size and structural features which enable the torque plate to be used in conjunction with brake rotor 16 of a reduced diameter, and also save weight and cost, while maintaining strength and performance to ensure optimum operation of the brake system, without post-weld processing. The improved torque plate for heavy-duty vehicles of the present invention satisfies these needs, as will now be described.

Figure 3:
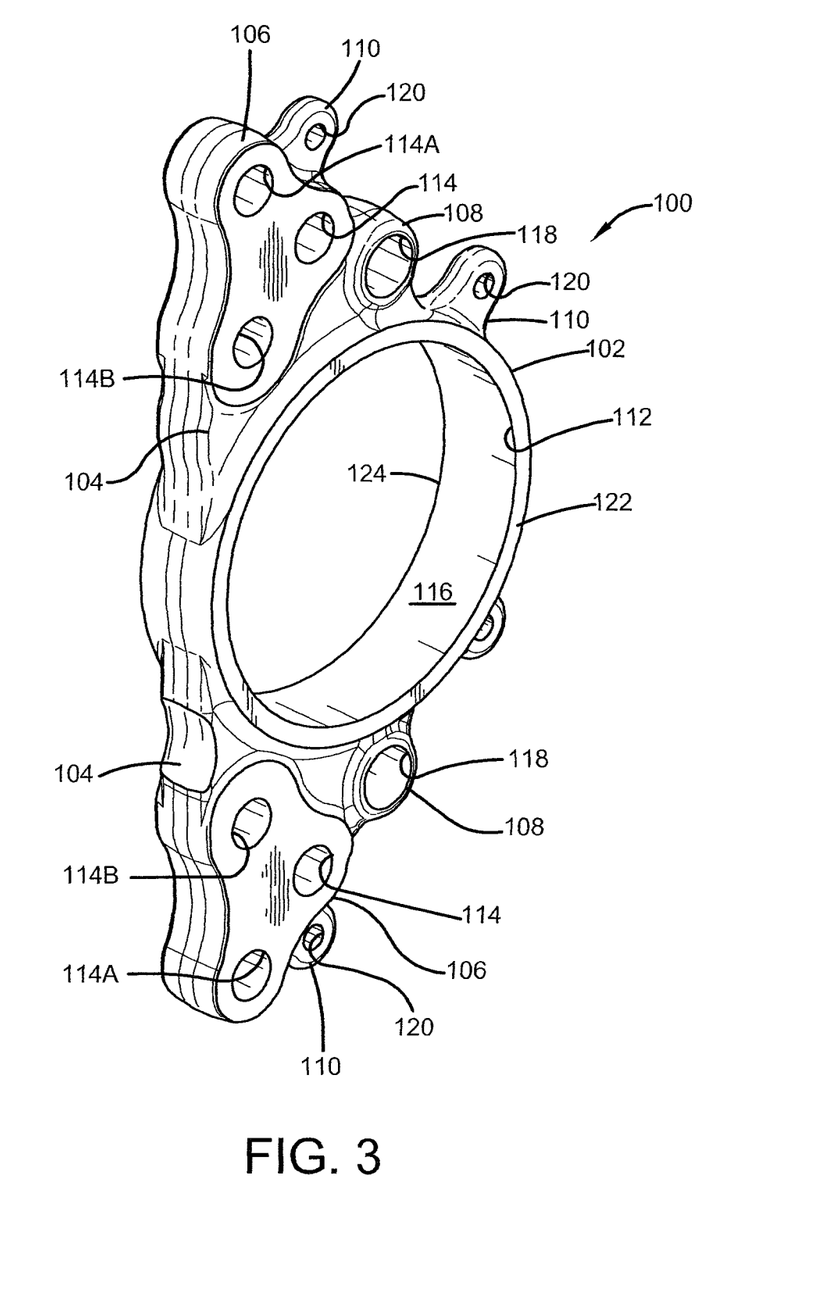
FIG. 3 is a rear perspective view of an exemplary embodiment of the improved torque plate for heavy-duty vehicles of the present invention.
Figure 4:
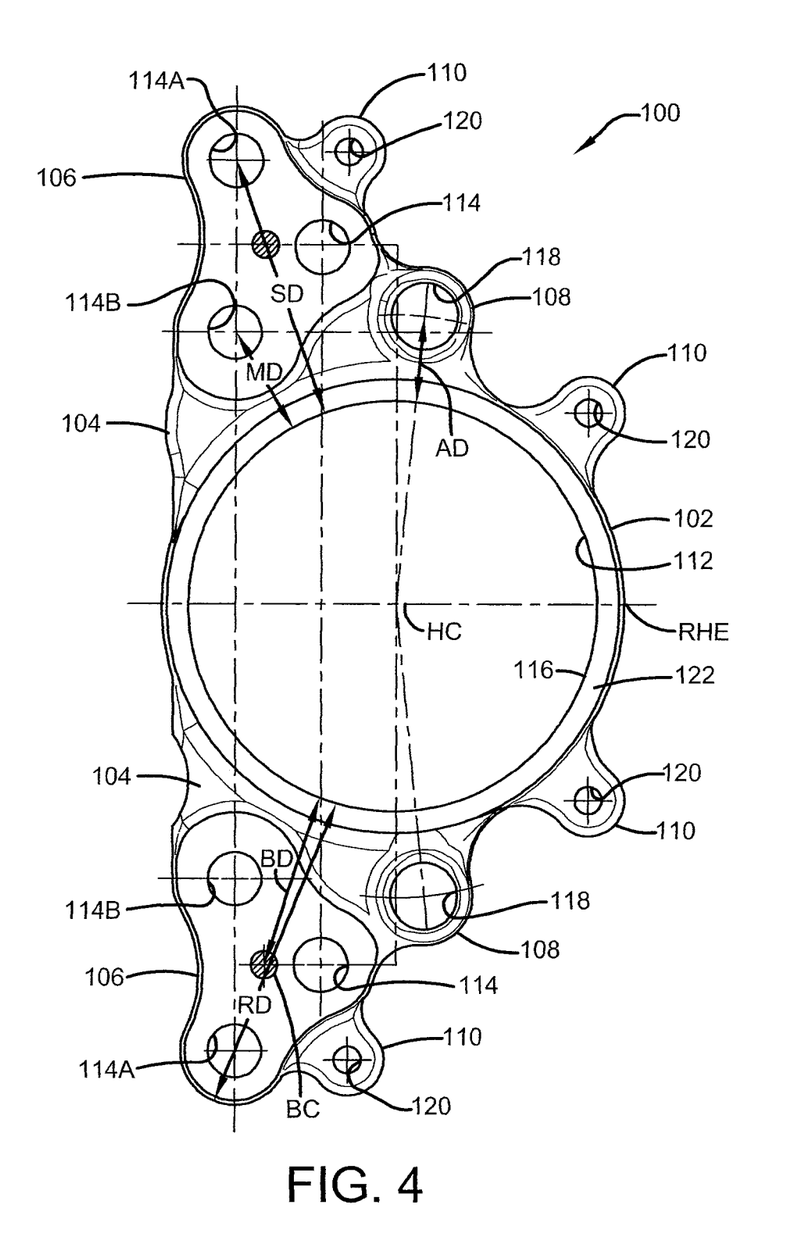
FIG. 4 is a side elevational view of the improved torque plate shown in FIG. 3.
Figure 5:
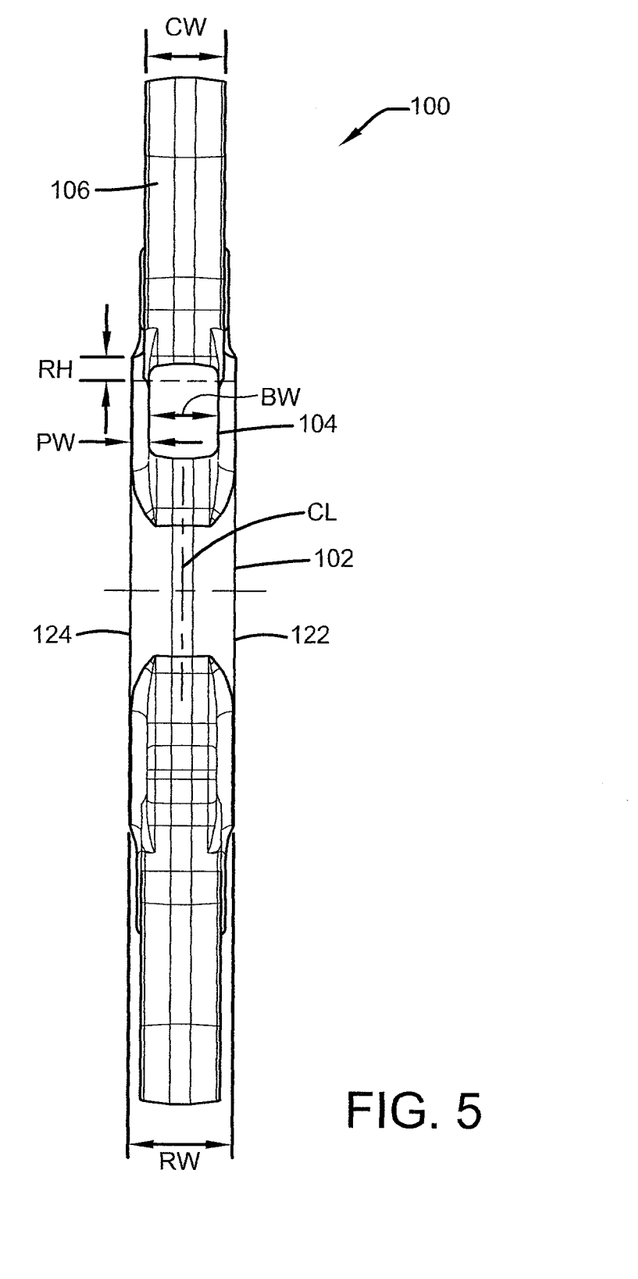
FIG. 5 is a rear end view of the improved torque plate shown in FIG. 3.

A first embodiment of the improved torque plate for heavy-duty vehicles of the present invention is indicated generally at 100 and is shown in FIGS. 3-5. Torque plate 100 is a one-piece unit that includes integrally-formed axle or weld ring 102, bodies 104, carrier mounting bosses 106, anti-lock braking (ABS) sensor mounting bosses 108, and splash guard mounting bosses 110. More particularly, each one of a pair of bodies 104 extends radially outwardly in opposite directions from axle ring 102, and each one of a pair of carrier mounting bosses 106 extends radially outwardly from a respective one of the bodies. Each one of a pair of ABS sensor mounting bosses 108 extends radially outwardly in generally opposite directions from axle ring 102 adjacent each respective body 104. One or more pairs of splash guard mounting bosses 110 extend at least partially from axle ring 102 and/or carrier mounting bosses 106, as will be described in greater detail below.

Axle ring 102 is formed with an opening 112 that passes through torque plate 100 and engages the outer diameter of axle tube 11 (FIG. 1). Opening 112 includes a diameter that is sized to constitute a slip fit with axle tube 11, and is of a specific size that is dictated by the outer diameter of the particular axle that is employed. For example, axle ring opening 112 may be sized for a slip fit that engages an axle tube having a 5.000 inch outer diameter, a 5.375 inch outer diameter, a 5.750 inch outer diameter, or other axle diameters known in the art.

Axle ring 102 includes opposing sides or edges 122 and 124, respectively, and one or both of the sides are welded to axle central tube 11 to rigidly attach torque plate 100 to the axle. Axle ring 102 preferably includes a thickness of about 1.400 inches as indicated by RW in FIG. 5. By comparison, each carrier mounting boss 106 preferably includes a thickness of about 1.070 inches as indicated by CW, and each body 104 preferably includes a thickness of about 0.95 inches as indicated by BW. This difference in thickness between axle ring 102 and bodies 104 enables the axle ring to provide a stable platform for the attachment of torque plate 100 to axle 11, while minimizing the material required to form the torque plate and reducing the bending moment about the weld at the axle ring. In this manner, torque plate 100 enables a square connection with axle spindle center line C (FIG. 2) to be achieved, while minimizing the weight and cost of the torque plate.

As mentioned above, one or both of axle ring sides 122 and 124 are welded to axle tube 11. Because thickness RW increases the footprint of axle ring 102 on axle tube 11, axle ring sides 122 and 124 and their respective welds are thus moved away from the platform under the main cross section or longitudinal centerline CL (FIG. 5) of torque plate 100. Locating the welds away from the main cross section or longitudinal centerline CL of torque plate 100 moves the heat affected zone associated with each respective weld away from the platform under the main cross section or longitudinal centerline CL of the torque plate, which reduces distortion of the torque plate due to welding, and improves the strength and stability of the axle. Such reduction of distortion of torque plate 100 and improvement of the strength and stability of axle tube 11 maintains the squareness of the torque plate in relation to axle spindle center line C, thereby enabling optimum functioning of brake assembly 15 (FIG. 2).

Thus, it can be appreciated that the difference between thickness BW of torque plate bodies 104 and thickness RW of axle ring 102 is significant. This structural relationship may be expressed as a ratio R1 of thickness BW of each of torque plate bodies 104 to thickness RW of axle ring 102. To achieve the desired stable platform of axle ring 102, while minimizing thickness BW of bodies 104 to reduce the weight and cost of torque plate 100, it is desirable for ratio R1 to be less than 1.00. By way of example, when body thickness BW is about 0.95 inches, and axle ring thickness RW is about 1.400 inches, ratio R1 is about 0.68.

Likewise, the difference between thickness CW of each carrier mounting boss 106 and thickness RW of axle ring 102 is significant. This structural relationship may be expressed as a ratio R2 of thickness CW of each carrier mounting boss 106 to thickness RW of axle ring 102. To achieve the desired stable platform of axle ring 102, while minimizing thickness CW of each carrier mounting boss 106 to reduce the weight and cost of torque plate 100, it is desirable for ratio R2 to be less than 1.00. By way of example, when carrier mounting boss thickness CW is about 1.070 inches, and axle ring thickness RW is about 1.400 inches, ratio R2 is about 0.76.

Torque plate 100 also includes specific structural features to enable the interface between axle ring 102 and each of bodies 104 to project outwardly a sufficient distance to isolate and thus support the weld at the axle ring, while also having sufficient stiffness to handle the bending moment between the axle ring and the body. These features include the radial height of axle ring 102, indicated by RH, and its relationship to its projection distance PW from base width or thickness BW of body 104. More particularly, radial height RH of axle ring 102 preferably is about 0.303 inches, and projection distance PW preferably is about 0.225 inches. The structural relationship between radial height RH and projection distance PW may be expressed as a ratio R3. To achieve the desired support for the weld while enabling sufficient stiffness to handle the bending moment, it is desirable for ratio R3 to be greater than 1.00. By way of example, when radial height RH is about 0.303 inches, and projection distance PW is about 0.225 inches, ratio R3 is about 1.35.

As noted above, typical prior art torque plates 14 have been hot rolled and then plasma cut, or they are cast or forged. Torque plates that are hot rolled and plasma cut typically have to be machined, which undesirably increases the cost of the torque plate, and/or include undesirable levels of residual stresses. Torque plates that are cast often experience issues with porosity that may lead to an increased scrap rate, which undesirably increases the cost of the torque plate. Prior art forged torque plates include residual stresses, but tend to be stronger than hot rolled or cast torque plates.

Torque plate 100 of the invention is forged from a readily-weldable material, such as steel. Forging torque plate 100 from steel, combined with the structural attributes of the torque plate described herein, enables axle ring 102 to be readily welded to axle central tube 11, while also being less susceptible to weld distortion than prior art hot rolled/plasma cut, cast, or forged torque plates 14. By being less susceptible to weld distortion, torque plate 100 of the invention maintains its squareness in relation to axle spindle center line C, thereby enabling optimum functioning of brake assembly 15 without the need for post-weld machining or processing of the torque plate, or for reworking or scrapping axles due to distortion of the torque plate. In this manner, the features of torque plate 100 enable it to desirably be formed economically and with minimal processing steps.

Each torque plate carrier mounting boss 106 is formed with three bolt openings 114 that pass through torque plate 100. In this manner, torque plate 100 includes six bolt openings 114 to enable bolts 18 (FIG. 2) to rigidly secure carrier 17 to the torque plate, and thus maintain caliper 20, brake pads 25, and/or other brake system components square to rotor 16 and ensure optimum operation of the components of brake assembly 15. In order to enable torque plate 100 to be employed with rotor 16 of a reduced diameter, such as about 415 mm, the torque plate includes unique optimization of the structural locations for bolt openings 114.

More particularly, torque plate 100 balances the competing considerations of minimizing the radial distance from axle spindle center line C, as dictated by the use of rotor 16 with a reduced diameter, against providing sufficient structural integrity to maintain the strength of the connection of carrier 17 to the torque plate. The unique optimization of the structural locations for bolt openings 114 employed by torque plate 100 achieves this balance. It is to be understood that the structural locations for bolt openings 114 described herein are shown by way of example in the context of torque plate 100 being installed on a non-drive, non-steer axle, and that appropriate adaptations to these structural locations will occur when the torque plate is installed on drive and/or steer axles.

An indicator of the optimization of structural locations for bolt openings 114 is the standoff distance SD of torque plate 100. Standoff distance SD is the shortest distance from the inner surface or inner diameter 116 of axle ring 102 to the center of the radially outermost bolt hole 114A (FIG. 4). Standoff distance SD is significant because the location of outermost bolt hole 114A is critical to the stability of torque plate 100 and its ability to maintain squareness relative to axle spindle center line C, and thus preventing tipping of the torque plate relative to the axle.

A ratio R4 of standoff distance SD to a distance MD, which extends from inner surface or inner diameter 116 of axle ring 102 to the center of the radially innermost bolt hole 114B, provides an indicator of the optimization of the structural locations for bolt openings 114 employed by torque plate 100. It is desirable for ratio R4 to be between about 2.20 and about 2.50 in order to indicate optimum location of radially outermost bolt opening 114A and radially innermost bolt opening 114B. By way of example, torque plate 100 includes a standoff distance SD of about 3.84 inches, and a distance MD of about 1.54 inches, which yields a ratio R4 of about 2.50. Such a value for ratio R4 indicates the optimization of the structural locations for bolt openings 114.

An additional ratio that provides an indicator of the optimization of the structural locations for bolt openings 114 employed by torque plate 100 is a ratio R5 between standoff distance SD and distance BD, which is the distance from inner surface or inner diameter 116 of axle ring 102 to the center BC of the bolt triangle formed by openings 114. It is desirable for ratio R5 to be between about 1.30 and about 1.70 in order to indicate optimum location of radially outermost bolt opening 114A and all bolt openings 114, as represented by center BC of the bolt triangle of these openings. By way of example, torque plate 100 includes a standoff distance SD of about 3.84 inches, and a distance BD of about 2.46 inches, which yields a ratio R5 of about 1.56. Such a value for ratio R5 indicates the optimization of the structural locations for bolt openings 114.

Another structural relationship that indicates the overall optimization of structure provided by torque plate 100 is a ratio R6 of the maximum thickness RW of the torque plate to the maximum radial distance RD the torque plate extends from axle 11 or inner surface 116 of axle ring 102. It is desirable for ratio R6 to be between about 0.22 and about 0.45, which indicates a wide, stable platform for torque plate 100 that is about half of the torque plate radial extension, which is as minimal as practicable in order to accommodate a rotor 16 of reduced diameter. By way of example, torque plate includes a maximum thickness RW of about 1.40 inches and a maximum radial distance RD of about 4.54 inches, which yields a value of about 0.31 for ratio R6.

An additional feature of torque plate 100 is ABS sensor mounting bosses 108. In the prior art, ABS sensors (not shown) are typically welded directly to axle tube 11. However, when the size of the torque plate is reduced in order accommodate a smaller diameter rotor 16, there is insufficient radial space to weld the ABS sensor to axle tube 11, particularly given the space constraints for a dual tire configuration. Torque plate 100 of the present invention solves this problem by incorporating ABS sensor mounting bosses 108. Preferably, torque plate 100 includes two mounting bosses 108, each one of which is formed with an opening 118. One opening 118 receives an ABS sensor while the other opening receives a reverse/backup sensor.

More particularly, by incorporating two ABS sensor mounting bosses 108, torque plate enables alternate positions for different ABS sensor mounting arrangements, and/or convenient and ready installation of an ABS sensor and a second sensor (not shown) for indication of reverse/backup movement of the vehicle. Such reverse/backup sensors have typically been separately welded onto axle tube 11 in the prior art. Torque plate 100 eliminates the need for such separate welding and accompanying structure, thereby reducing the weight and cost associated with installing a reverse/backup sensor or alternate positions for the ABS sensor.

Optimization of the location of openings 118 for ABS sensor and backup/reverse sensor is indicated by the structural relationships between the location of these openings and standoff distance SD of torque plate 100. More particularly, the distance from inner surface or inner diameter 116 of axle ring 102 to the center of each respective ABS sensor or reverse/backup sensor opening 118 is indicated by AD. By way of example, torque plate 100 preferably includes a standoff distance SD of about 3.84 inches, and a distance AD to the center of openings 118 of about 1.207 inches. It is desirable for a ratio R7 of standoff distance SD to distance AD to be less than about 4.00, and by way of example, ratio R7 for torque plate 100 yields a value of about 3.18.

Torque plate 100 also includes splash guard mounting bosses 110. Prior art torque plate 14 typically is formed with three openings (not shown) to mount a splash guard (not shown), which is used in the art to keep cross-splash, water, mud and debris out of brake assembly 15. One of the three openings (not shown) in prior art torque plate 14 extends along the horizontal centerline past the edge of the rest of the body of the torque plate. In order to provide optimum mounting of a splash guard, torque plate 100 is formed with at least two splash guard mounting bosses 110, and preferably four mounting bosses. More preferably, two splash guard mounting bosses 110 extend at least partially from axle ring 102 in a spaced apart manner as will be described in greater detail below, and each one of a pair of additional splash guard mounting bosses extends at least partially from a respective carrier mounting boss 106. Each splash guard mounting boss 110 is formed with an opening 120, which receives a mechanical fastener (not shown) to secure the splash guard to torque plate 100.

In order to provide optimum locating for multiple splash guard mounting bosses 110, the mounting bosses are offset from horizontal center line HC of torque plate 100. In addition, splash guard mounting bosses 110 do not substantially extend past the right-hand edge point of axle ring 102, as indicated by RHE in FIG. 4. By not substantially extending past point RHE, mounting bosses 110 enable a smaller billet to be employed to forge torque plate 100, thereby reducing the cost of the torque plate. Preferably, mounting bosses are formed when trimming the forging by shearing from the inboard side of torque plate 100 to the outboard side of the torque plate. Such forming, combined with the location of mounting bosses 110, enables the splash guard to seat on the flatter outboard edges of the bosses, which squares the splash guard off for easy installation and optimum positioning.

In this manner, improved torque plate 100 of the present invention achieves a reduced radial size, while maintaining performance through specific structural features. Torque plate 100 finds particular application in connection with rotors 16 of a reduced diameter, such as about 415 mm, and/or in wheel hubs and disc brake configurations that reduce the available radial space about the axle for the torque plate.

Torque plate 100 employs axle ring 102 that is thicker than bodies 104, which enables the axle ring to provide a stable platform for the attachment of the torque plate to axle 11, while minimizing the material required to form the torque plate. Torque plate 100 thus enables a square connection with axle spindle center line C to be achieved, which reduces performance variation, while desirably minimizing its weight and cost.

Torque plate 100 optimizes the structural locations for six bolt openings 114 to balance the minimization of the radial distance from axle spindle center line C, which is dictated by the use of a reduced-diameter rotor, against providing sufficient structural integrity to maintain the strength of the connection of the torque plate to carrier 17. Torque plate 100 thus maintains rigid attachment to carrier 17, thereby enabling caliper 20, brake pads 25, and/or other brake system components of be maintained square to rotor 16 to ensure optimum operation of the components of brake assembly 15.

Torque plate 100 also includes an integral pair of ABS sensor mounting bosses 108, which enable ready mounting of an ABS sensor and a reverse/backup sensor. Torque plate 100 further includes splash guard mounting bosses 110 with optimum locating that is offset from the torque plate horizontal centerline HC.

The present invention also includes a method of making and a method of using an improved torque plate for heavy-duty vehicles 100. The method includes steps in accordance with the description that is presented above and shown in FIGS. 3-5.

It is to be understood that the structure and arrangement of the above-described improved torque plate 100 for heavy-duty vehicles of the present invention may be altered or rearranged without affecting the overall concept or operation of the invention. For example, the above-described thicknesses (RW, BW, and CW), heights (RH), and distances (PW, MD, SD, BD, RD, and AD) of the features of torque plate 100 may be altered or adjusted for particular design considerations, while the corresponding ratios (R1, R2, R3, R4, R5, R6, and R7) remain in the ranges that are set forth above, without affecting the overall concept or operation of the invention. In addition, the improved torque plate 100 for heavy-duty vehicles of the present invention may be employed with other types of axles, wheel end assemblies, axle/suspension systems, and/or brake systems than those shown and described above, without affecting the overall concept or operation of the invention. For example, improved torque plate 100 can be used on steerable and non-steerable axles, and on drive and non-drive axles, without affecting the overall concept or operation of the invention.

Moreover, while reference herein has been made generally to a heavy-duty vehicle for the purpose of convenience, it has been with the understanding that such reference includes trucks, tractor-trailers and semi-trailers, and trailers thereof.

Accordingly, the improved torque plate for heavy-duty vehicles of the present invention is simplified, provides an effective, safe, inexpensive, and efficient structure which achieves all the enumerated objectives, provides for eliminating difficulties encountered with prior art torque plates, and solves problems and obtains new results in the art.

In the foregoing description, certain terms have been used for brevity, clarity and understanding; but no unnecessary limitations are to be implied therefrom beyond the requirements of the prior art, because such terms are used for descriptive purposes and are intended to be broadly construed. Moreover, the present invention has been described with reference to an exemplary embodiment. It shall be understood that this illustration is by way of example and not by way of limitation, as the scope of the invention is not limited to the exact details shown or described. Potential modifications and alterations will occur to others upon a reading and understanding of this disclosure, and it is understood that the invention includes all such modifications and alterations and equivalents thereof.

Having now described the features, discoveries and principles of the invention, the mariner in which the improved torque plate for heavy-duty vehicles of the present invention is constructed, arranged and used, the characteristics of the construction and arrangement, and the advantageous, new and useful results obtained; the new and useful structures, devices, elements, arrangements, parts and combinations are set forth in the appended claims.

What is claimed is:

1. A torque plate to mount a disk brake component for heavy-duty vehicles, said torque plate being rigidly attachable to an axle of said heavy-duty vehicle, said torque plate comprising:

an axle ring, said axle ring being formed with an opening for receiving and engaging an outer diameter of the axle;

a pair of bodies extends radially outwardly in opposite directions from said axle ring; and a pair of carrier mounting bosses, each one of which extending radially outwardly from a respective one of said bodies, each one of said carrier mounting bosses being formed with a plurality of openings for receiving fasteners, and wherein a ratio of a shortest distance extending from an inner surface of said axle ring to a center of the radially outermost one of said openings to a shortest distance extending from said inner surface of the axle ring to a center of a bolt triangle formed by said plurality of openings is between about 1.30 and about 1.70.

2. The torque plate of claim 1, wherein said torque plate is employed with a disc brake system that includes a brake rotor formed with a diameter of about 415 millimeters.

3. The torque plate of claim 1, wherein said axle ring is formed with a thickness that is greater than a thickness of each one of said carrier mounting bosses.

4. The torque plate of claim 3, wherein a ratio of a thickness of at least one of said carrier mounting bosses to a thickness of said axle ring is less than about 1.00.

5. The torque plate of claim 4, wherein said thickness of said at least one carrier mounting boss is about 1.070 inches, said thickness of said axle ring is about 1.400 inches, and said ratio is about 0.76.

6. The torque plate of claim 1, wherein each of said carrier mounting bosses is formed with a thickness that is greater than a thickness that at least one of said bodies is formed with.

7. The torque plate of claim 1, wherein a ratio of a thickness that at least one of said bodies is formed with to a thickness that said axle ring is formed with is less than about 1.00.

8. The torque plate of claim 7, wherein said thickness of said at least one of said bodies is about 0.95 inches, said thickness of said axle ring is about 1.400 inches, and said ratio is about 0.68.

9. The torque plate of claim 5, wherein each said carrier mounting boss thickness that is greater than a thickness of each of said bodies.

10. The torque plate of claim 1, wherein a ratio of a radial height of said axle ring to a projection distance of the axle ring from a base thickness of at least one of said bodies is greater than about 1.00.

11. The torque plate of claim 10, wherein said radial height of said axle ring is about 0.303 inches, said projection distance of the axle ring from said base thickness of at least one of said bodies is about 0.225 inches, and said ratio is about 1.35.

12. The torque plate of claim 1, wherein said torque plate is forged from steel.

13. A torque plate of claim 1, wherein each one of said carrier mounting bosses is formed with a plurality of openings for receiving fasteners, wherein a ratio of the shortest distance extending from an inner surface of said axle ring to a center of the radially outermost one of said openings to a shortest distance extending from said inner surface of the axle ring to a center of the radially innermost one of the openings is between about 2.20 and about 2.50.

14. The torque plate for of claim 1, wherein a ratio of the maximum thickness of said torque plate to a maximum radial distance the torque plate extends from an inner surface of said axle ring is between about 0.22 and about 0.45.

15. The torque plate of claim 14, wherein said ratio of the maximum thickness of said torque plate to the maximum radial distance the torque plate extends from an inner surface of said axle ring is about 0.31.

* * * * *